United States Patent
Jung et al.

(10) Patent No.: US 10,160,346 B2
(45) Date of Patent: Dec. 25, 2018

(54) EXHAUST PORT STRUCTURE OF FUEL CELL VEHICLE

(71) Applicant: Hyundai Motor Company, Seoul (KR)

(72) Inventors: Myung Ju Jung, Daejeon (KR); Hyuck Roul Kwon, Gyeonggi-do (KR); Sang Hoon Seo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/729,146

(22) Filed: Jun. 3, 2015

(65) Prior Publication Data

US 2016/0159248 A1    Jun. 9, 2016

(30) Foreign Application Priority Data

Dec. 3, 2014    (KR) .................. 10-2014-0172181

(51) Int. Cl.
   *H01M 8/0662*    (2016.01)
   *B60L 11/18*    (2006.01)
   *H01M 8/04*    (2016.01)

(52) U.S. Cl.
   CPC ........... *B60L 11/1898* (2013.01); *H01M 8/04* (2013.01); *H01M 8/0662* (2013.01); *H01M 2250/20* (2013.01); *Y02T 90/32* (2013.01)

(58) Field of Classification Search
   CPC ............... H01M 8/04; H01M 8/0662
   USPC .................. 137/88, 89, 115.01, 599.11, 888
   See application file for complete search history.

(56) References Cited

U.S. PATENT DOCUMENTS

| 7,178,545 | B2 * | 2/2007 | Zelczer ................ G05D 7/03 137/115.07 |
| 2003/0077488 | A1 | 4/2003 | Yamamoto et al. |
| 2005/0118471 | A1 * | 6/2005 | Fukuma ............ H01M 8/0662 429/427 |
| 2007/0053137 | A1 | 3/2007 | Fu et al. |
| 2007/0053237 | A1 | 3/2007 | Yoshida et al. |
| 2009/0282981 | A1 | 11/2009 | Kitamura |
| 2010/0092812 | A1 | 4/2010 | Ishiguro et al. |
| 2010/0183944 | A1 | 7/2010 | Ogawa et al. |

(Continued)

FOREIGN PATENT DOCUMENTS

| CN | 101323247 A | 12/2008 |
| CN | 101409353 A | 4/2009 |

(Continued)

*Primary Examiner* — Michael R Reid
*Assistant Examiner* — Paul J Gray
(74) *Attorney, Agent, or Firm* — Mintz Levin Cohn Ferris Glovsky and Popeo, P.C.; Peter F. Corless

(57) ABSTRACT

An exhaust port structure of a fuel cell vehicle includes a re-circulation fluid passage mounted on an upper portion of an exhaust pipe so as to be arranged parallel to the exhaust pipe, and a mixing pipe mounted on an end of the exhaust pipe and through which external air is suctioned. When a concentration of hydrogen in exhaust gas exceeds a reference value, hydrogen is re-circulated into the exhaust pipe via the re-circulation fluid passage and mixed with external air through the mixing pipe before being exhausted to outside. As a result, during starting and hydrogen purge to remove hydrogen from a fuel cell, the gas with high hydrogen concentration exhausted from the fuel cell and exhausted out of the vehicle can have reduced hydrogen concentration through the re-circulation fluid passage and the mixing pipe.

11 Claims, 4 Drawing Sheets

(56) References Cited

U.S. PATENT DOCUMENTS

| | | |
|---|---|---|
| 2011/0048837 A1 | 3/2011 | Kwon et al. |
| 2011/0192139 A1 | 8/2011 | Paik |
| 2013/0122386 A1* | 5/2013 | Weispfenning ... H01M 8/04201 |
| | | 429/427 |

FOREIGN PATENT DOCUMENTS

| | | |
|---|---|---|
| JP | 2003-132915 A | 5/2003 |
| JP | 2006-031999 A | 2/2006 |
| JP | 2007-035406 A | 2/2007 |
| JP | 2008-276959 A | 11/2008 |
| JP | 2009-170209 A | 7/2009 |
| KR | 10-0645247 B1 | 11/2006 |
| KR | 10-0773595 B1 | 11/2007 |
| KR | 10-1089025 B1 | 12/2011 |
| KR | 10-1160900 B1 | 6/2012 |

* cited by examiner

EXHAUST PORT STRUCTURE OF FUEL CELL VEHICLE

CROSS-REFERENCE TO RELATED APPLICATION

This application claims under 35 U.S.C. § 119(a) the benefit of Korean Patent Application No. 10-2014-0172181, filed on Dec. 3, 2014 in the Korean Intellectual Property Office, the entire contents of which are incorporated herein by reference.

BACKGROUND

(a) Technical Field

The present invention relates to an exhaust port structure of a fuel cell vehicle, and more particularly, to an exhaust port structure that reduces a concentration of hydrogen in an exhaust gas that is exhausted from a fuel cell during starting, by delaying a time point of exhausting the gas into the air, using an exhaust port.

(b) Description of the Related Art

Generally, a fuel cell system has to manage exhaust gas at a predetermined hydrogen concentration, to prevent ignition and explosion of exhaust gas. However, a purge valve and crossover can lead to exhaustion of a considerable amount of hydrogen.

Meanwhile, the hydrogen concentration in the exhaust gas has to be maintained under a predetermined level in all operation conditions. However, a conventional hydrogen concentration dilution system for exhaust gas uses external air, and thus requires additional structure to draw in the external air to reduce the hydrogen concentration. Accordingly, such a structure is complex, and exhaust gas sometimes still contains un-diffused hydrogen concentration, depending on operating conditions.

SUMMARY

An aspect of the present invention provides an exhaust port structure of a fuel cell vehicle, which can reduce concentration of hydrogen in an exhaust gas exhausted into the air during initial starting and hydrogen purge of the fuel cell vehicle.

According to an exemplary embodiment of the present invention, an exhaust port structure of a fuel cell vehicle includes a re-circulation fluid passage mounted on an upper portion of an exhaust pipe so as to be arranged parallel to the exhaust pipe, and a mixing pipe mounted on an end of the exhaust pipe and through which external air is suctioned, in which, when a concentration of hydrogen in exhaust gas exceeds a reference value, hydrogen is re-circulated into the exhaust pipe through the re-circulation fluid passage and mixed with the external air through the mixing pipe, before being exhausted to outside.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

An exemplary embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
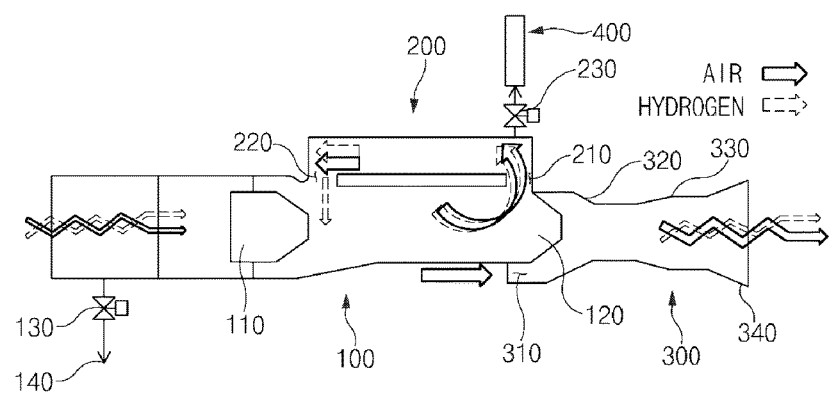
FIG. 1 is a schematic diagram of an exhaust port structure of a fuel cell vehicle according to an exemplary embodiment of the present invention.
Figure 2:
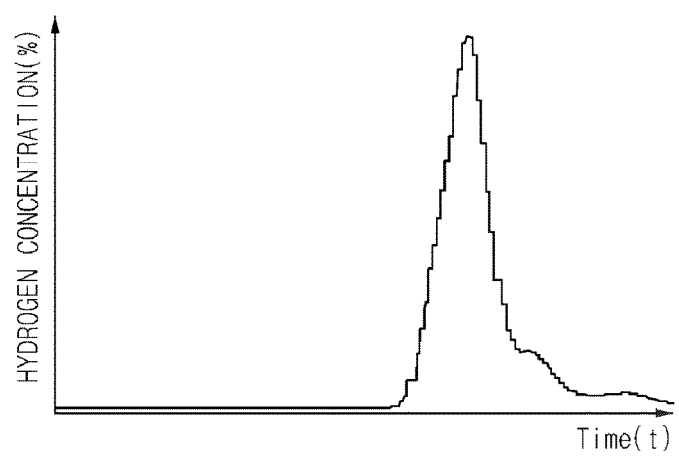
FIG. 2 is a graph of hydrogen concentration measurement data which is exhausted after starting of the fuel cell vehicle of FIG. 1.
Figure 3:
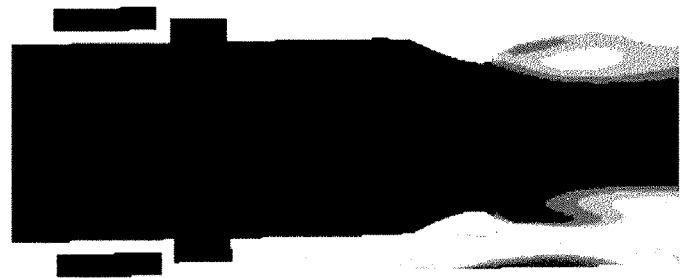
FIG. 3 is an analytical image of hydrogen concentration in the exhaust gas flowing inside an exhaust pipe of the fuel cell vehicle of FIG. 1.

Referring to FIGS. 1 to 3, an exhaust port structure of a fuel cell vehicle according to an exemplary embodiment of the present invention may include: a re-circulation fluid passage 200 provided with a first port hole 210 through which a mixed gas of hydrogen and air flowing inside an exhaust pipe 100 is introduced, and a second port hole 220 through which the mixed gas is re-introduced into the exhaust pipe 100; and a mixing pipe 300 mounted on an end of the exhaust pipe 100 and provided with an air intake path 310 through which external air is suctioned in, and which mixes the mixed gas re-introduced into the exhaust pipe 100 with the external air and exhausts the same to outside.

The exhaust pipe 100 may include a second ejector 110 formed on the exhaust pipe 100 so as to be positioned on one side of the second port hole 220, and a first ejector 120 formed on an end of the exhaust pipe 100 so as to be positioned on one side of the mixing pipe 300. The exhaust pipe 100 may additionally include a first valve 130 and a first outlet 140 formed on a leading end of the second ejector 110.

The mixing pipe 300 may include a venturi nozzle 320 to mix the mixed air passed through the first ejector 120 with external air suctioned in through the air intake path 310, and an extended portion 330 extended externally from the venturi nozzle in a pipe expanding manner and a second outlet 340. In an exemplary embodiment of the present invention, the second outlet 340 has a larger inner diameter than that of the extended portion 330. The external air is introduced from outside the exhaust pipe 100 into the mixing pipe 300. The introduced air may be introduced from outside the exhaust pipe 100 into the mixing pipe 300, and may be fed from air intake system to the mixing pipe 300.

The re-circulation fluid passage 200 may be in parallel relationship with the exhaust pipe 100 and formed on an upper portion of the exhaust pipe 100 so as to be positioned above the exhaust pipe 100. The re-circulation fluid passage 200 may be connected to an air intake duct 400 which supplies external air to the fuel cell stacks. A second valve 230 may be positioned between the re-circulation fluid passage 200 and the air intake duct 400.

The exhaust port structure of a fuel cell vehicle constructed as described above according to an exemplary embodiment of the present invention will be explained in more detail below. To generate flow of mixed gas that is moving into the re-circulation fluid passage 200, the second valve 230 is operated and the re-circulation fluid passage 200 and the air intake duct 400 are fluidly communicated with each other. In this case, the mixed gas is suctioned into the air intake duct 400 and the re-circulation fluid passage 200.

The mixed gas suctioned into the air intake duct 400 is introduced again into the fuel cell and the mixed gas suctioned into the re-circulation fluid passage 200 is re-circulated into the exhaust pipe 100. The mixed gas re-circulated into the exhaust pipe 100 passes through the mixing pipe 300 where it is mixed with the external air introduced into the mixing pipe 300, and then exhausted with reduced hydrogen concentration to the outside.

According to an exemplary embodiment of the present invention, the re-circulation fluid passage 200 and the air intake duct 400 are fluidly communicated, when the mixed gas introduced into the second ejector 110 provided on the exhaust pipe 100 has higher hydrogen concentration than the mixed gas present in the connecting portion between the exhaust pipe 100 and the re-circulation fluid passage 200 (or more specifically, present in the first port hole 210).

Referring to FIG. 2, according to the present invention, within several seconds after starting, the hydrogen concentration reaches maximum degrees. Referring to FIG. 3, the hydrogen concentration varies between upper end and lower end inside the exhaust pipe 100 due to differences in density, in accordance with the present invention.

In particular, according to the present invention, the re-circulation fluid passage 200 is positioned above the exhaust pipe 100, thus allowing the high concentration of hydrogen to be introduced into the re-circulation fluid passage 200 via the first port hole 210. Further, as the negative pressure generated from the operation of the second valve 230 positioned between the re-circulation fluid passage 200 and the air intake duct 400 suctions the hydrogen flowing the exhaust pipe 100, more hydrogen gas is introduced into the re-circulation fluid passage 200.

The new mixed gas that is continuously exhausted from the fuel cell passes through the second ejector 110, and after passing through the second ejector 110, the new mixed gas causes the mixed gas inside the re-circulation fluid passage 200 to be re-introduced into the exhaust pipe 100 through the second port hole 220. Accordingly, the first mixed gas is formed, as the mixed gas with high hydrogen concentration that is re-introduced into the exhaust pipe 100 from the re-circulation fluid passage 200 is mixed with the new mixed gas between the second ejector 110 and the first ejector 120.

Upon passing through the first ejector 120, the first mixed gas causes external air to be suctioned into the mixing pipe 300 through the air intake path 310. The first mixed gas and the external air are mixed to form second mixed gas while passing through the venturi nozzle 320 formed on the mixing pipe 300. The second mixed gas is reduced in speed as it passes through the extended portion 330 formed on the mixing pipe 300 and accordingly, passes through the second outlet 340 with maximum amount of external air mixed therein (i.e., with minimum hydrogen concentration) and exhausted to outside.

The extended portion 330 and the second outlet 340 are arranged such that a width of the mixing pipe 300 is expanded in this region from the venturi nozzle 320, and slows down the second mixed gas that is mixed while passing through the venturi nozzle 320. The second mixed gas, of which speed is reduced through the extended portion 330, is mixed with the air in the atmosphere more rapidly than when the speed is not reduced.

The first outlet 140 is mounted to reduce back pressure generated due to the re-circulation fluid passage 200 and the mixing pipe 300. During initial starting, influence of the back pressure is minute in a low flowrate range. However, in a high flowrate range, that is, in a high output range in which a relatively large amount of mixed gas is exhausted outside through the exhaust pipe 100 during starting, excessive back pressure is generated due to the re-circulation passage, the second ejector 110, the first ejector 120 and the mixing pipe 300.

Excessive back pressure degrades performance of the fuel cells. Meanwhile, in the high flowrate range, hydrogen is rarely exhausted. Accordingly, it is preferable to exhaust the mixed gas through the first outlet 140 to the outside, so as to lower the back pressure and maintain the performance of the fuel cell within a normal range. The first valve 130, which connects the exhaust pipe 100 and the first outlet 140 in fluid communication with each other or blocks the fluid communication therebetween, operates to connect the exhaust pipe 100 and the first outlet 140 in fluid communication, when the inner pressure of the exhaust pipe 100 exceeds a predetermined value.

Figure 4:
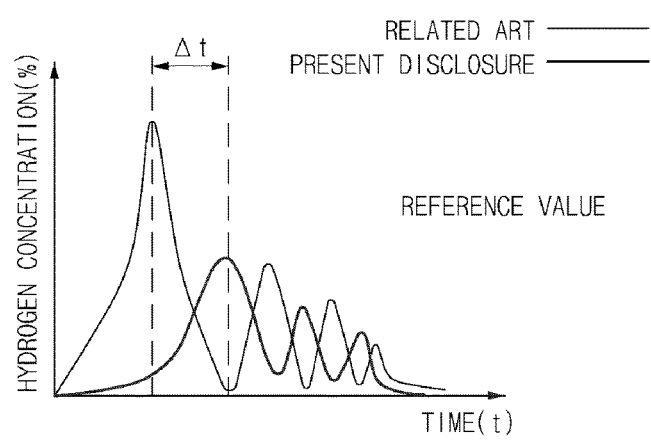
FIG. 4 is a hydrogen discharge rate comparison graph between a vehicle mounted with the exhaust port structure of the fuel cell vehicle of FIG. 1 and a conventional vehicle without the same.

Referring to FIG. 4, the fuel cell vehicle having the exhaust port structure constructed as described above according to the exemplary embodiment of the present invention as shown in FIG. 1 has an initial exhaustion of hydrogen concentration that is reduced to below a reference value, as compared to a conventional vehicle that does not employ the exhaust port structure according to the present invention.

As set forth above, according to exemplary embodiments of the present invention, an exhaust port structure of a fuel cell vehicle is arranged such that a reduced concentration of hydrogen is exhausted during starting and hydrogen purge to remove hydrogen from a fuel cell, as the gas with high hydrogen concentration discharged from the fuel cell and exhausted out of the vehicle can have reduced hydrogen concentration while passing through a re-circulation fluid passage and a mixing pipe. As a result, safety of the fuel cell vehicle is enhanced.

Further, during air blower operation and hydrogen purge, hydrogen can be diffused through the re-circulation fluid passage.

Further, mixed gas of hydrogen and air can be re-circulated without requiring a separate actuator, while hydrogen concentration can be reduced.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. An exhaust port structure of a fuel cell vehicle, comprising: a re-circulation fluid passage configured with a first port hole through which a mixed gas of hydrogen and air flowing inside an exhaust pipe is introduced, and a second port hole through which the mixed gas is re-introduced into the exhaust pipe; and a mixing pipe configured with an air intake path through which external air is suctioned, the mixing pipe mounted on an end of the exhaust pipe to mix the mixed gas re-introduced into the exhaust pipe with the external air and exhaust it to outside, wherein the exhaust pipe includes: a first ejector formed on the end of the exhaust pipe so as to be positioned at an end of the mixing pipe; and a second ejector formed on the exhaust pipe so as to be positioned adjacent to one side of the second port hole, wherein a venturi nozzle is configured to mix the mixed gas passing through the first ejector and the external air suctioned through the air intake path, wherein the re-circulation fluid passage is connected to an air intake duct configured to supply external air to fuel cell stack, wherein a valve is positioned between the re-circulation fluid passage and the air intake duct such that the air intake duct suctions hydrogen to introduce more hydrogen gas into the re-circulation fluid passage, and wherein the air intake duct is positioned upstream of the first ejector and downstream of the second port hole with respect to the fluid flow direction through the exhaust pipe.

2. The exhaust port structure according to claim 1, wherein the mixed gas present in the re-circulation fluid passage is re-suctioned into the exhaust pipe through the second port hole.

3. The exhaust port structure according to claim 1, wherein the exhaust pipe further includes a first valve and a first outlet formed on a leading end of the first ejector.

4. The exhaust port structure according to claim 3, wherein when inner pressure of the exhaust pipe exceeds a predetermined value, the first valve is operated so that the exhaust pipe and the first outlet are in fluid communication with each other.

5. The exhaust port structure according to claim 4, wherein the external air is suctioned into the mixing pipe through the air intake path.

6. The exhaust port structure according to claim 5, wherein the mixing pipe includes:

the venturi nozzle configured to mix the mixed gas passing through the first ejector and the external air suctioned through the air intake path; and a second outlet and an extended portion from the venturi nozzle.

7. The exhaust port structure according to claim 6, wherein the second outlet has a larger inner diameter than that of the extended portion.

8. The exhaust port structure according to claim 4, wherein the re-circulation fluid passage is in parallel relationship with the exhaust pipe, and is formed on an upper portion of the exhaust pipe so as to be positioned above the exhaust pipe.

9. The exhaust port structure according to claim 4, wherein when the valve opens, the mixed gas is suctioned from the exhaust pipe into the re-circulation fluid passage.

10. An exhaust port structure of a fuel cell vehicle, comprising: a re-circulation fluid passage mounted on an upper portion of an exhaust pipe so as to be arranged parallel to the exhaust pipe; and a mixing pipe mounted on an end of the exhaust pipe and through which external air is suctioned, wherein the re-circulation fluid passage is in fluid communication with an air intake duct so as to generate a flow of mixed gas moving into the re-circulation fluid passage, the exhaust pipe recirculates the mixed gas through the re-circulation fluid passage, and the mixed gas, which is re-circulated into the exhaust pipe, is mixed with the external air through the mixing pipe and then exhausted to outside, wherein the exhaust pipe includes: a first ejector formed on the end of the exhaust pipe so as to be positioned at an end of the mixing pipe; and a second ejector formed on the exhaust pipe so as to be positioned adjacent to one side of a second port hole, wherein the re-circulation fluid passage is connected to an air intake duct configured to supply external air to fuel cell stacks, and wherein a valve is positioned between the re-circulation fluid passage and the air intake duct such that the air intake duct suctions hydrogen to introduce more hydrogen gas into the re-circulation fluid passage, and wherein the air intake duct is positioned upstream of the first ejector and downstream of the second port hole with respect to the fluid flow direction through the exhaust pipe.

11. The exhaust port structure according to claim 10, wherein when a concentration of hydrogen of the mixed gas introduced into the exhaust pipe is greater than the concentration of hydrogen of the mixed gas present at a connection portion of the exhaust pipe and the re-circulation fluid passage, the re-circulation fluid passage and the air intake duct are in fluid communication with each other.

* * * * *